United States Patent [19]
Hubbard et al.

[11] 3,742,890
[45] July 3, 1973

[54] FREE TRAILING FORWARD HYDROFOIL STRUT

[75] Inventors: Robert M. Hubbard, Kent; Philip C. Whitener, Seattle, both of Wash.

[73] Assignee: The Boeing Company, Seattle, Wash.

[22] Filed: Sept. 9, 1971

[21] Appl. No.: 178,974

[52] U.S. Cl. ............................................. 114/665 H
[51] Int. Cl. .............................................. B63b 1/28
[58] Field of Search ................. 114/66.5 R, 66.5 H, 114/66.5 P

[56] References Cited
UNITED STATES PATENTS

| | | | |
|---|---|---|---|
| 2,771,051 | 11/1956 | Von Schertel | 114/66.5 H |
| 3,180,300 | 4/1965 | Singelmann | 144/66.5 H |
| 3,456,609 | 7/1969 | Nott | 114/66.5 H |
| 3,465,704 | 9/1969 | Baker | 114/66.5 H |

*Primary Examiner*—Milton Buchler
*Assistant Examiner*—Barry L. Kelmachter
*Attorney*—Kenneth W. Thomas and Nicolaas De Vogel

[57] ABSTRACT

A fully submerged foil type hydrofoil craft having aft mounted strut means and a single forward strut. The forward strut is swivelably mounted to the hull in a free trailing uncontrolled arrangement, limited only by suitable damping means.

10 Claims, 3 Drawing Figures

PATENTED JUL 3 1973
3,742,890
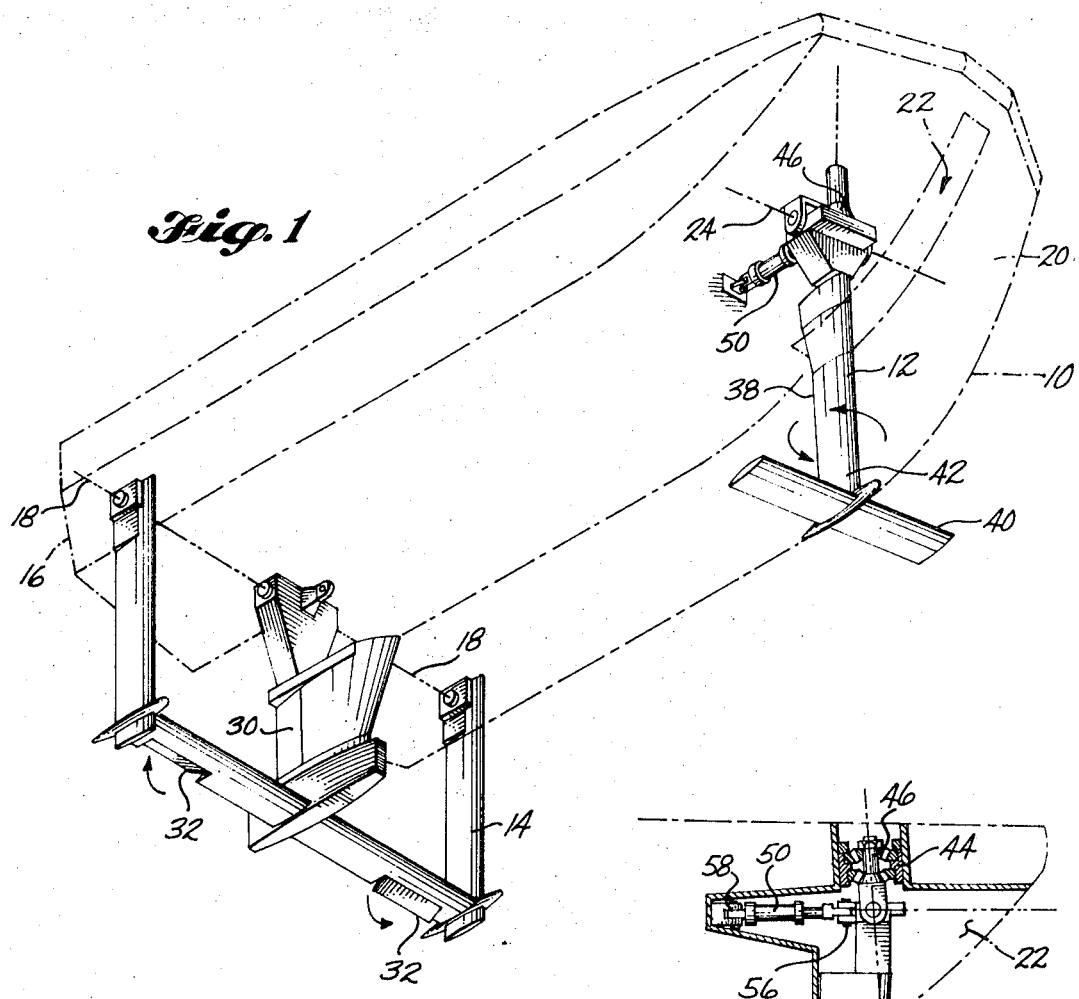
Fig.1
Fig.2
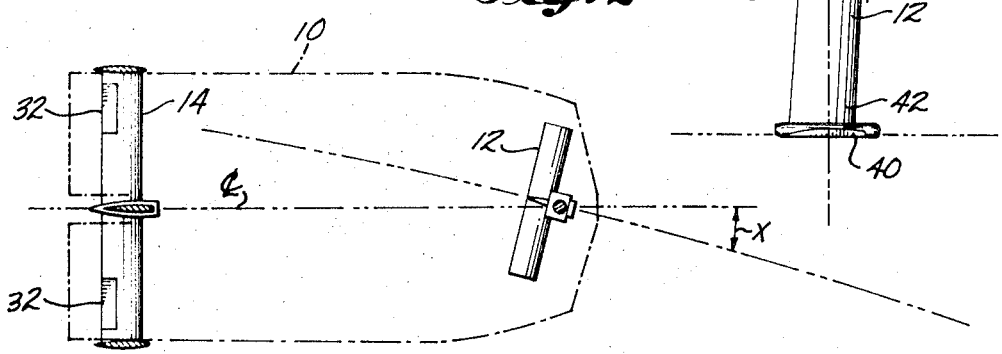
Fig.3

FREE TRAILING FORWARD HYDROFOIL STRUT

BACKGROUND OF THE INVENTION

1. Field of the Invention

This invention relates to hydrofoil struts for a hydrofoil craft and pertains more specifically to hydrofoil craft of the so-called "canard" configuration utilizing a single, swivelably mounted forward strut.

2. Description of the Prior Art

The concept of providing a freely swivelable strut in a hydrofoil craft has not been observed in the art and during the course of an extensive patent art search. Therefore, comparison of the present inventive concept can only be made to the steerable swivelable struts in current new hydrofoil craft for providing directional control.

As a first comparison, it should be noted that the size and capacity of the actuation equipment required to control the swiveled strut have exceeded the actuation equipment requirements of the foil control surfaces. As larger hydrofoil ships are considered, the cost and complexity of the strut actuation equipment become matters of serious concern.

Also, operational experiences have shown that the banked turn, achieved through a roll-to-steer control mode and using the steerable forward strut, is the superior means for accomplishing directional control of a hydrofoil craft. Unfortunately, the simple, dependable controllers now in use produce banked turns which are perfectly coordinated (in other words, without side slip or 100 percent banked) only at one preselected speed. As speed is varied, the banked turns depart from perfect coordination and many of the benefits of banked turns are degraded.

A more sophisticated analysis shows that a free trailing forward strut offers a higher stability to hydrofoil craft. As known, all submerged-foil hydrofoil craft are plagued with the inherent problem of static directional stability margins that are widely variable as a function of pitch attitude, operating foil depth and differential strut immersion in waves. This variability of stability characteristics is a source of adverse yawing motions in rough water and potentially represents a safety hazard under extreme operating conditions. The introduction of disproportionately large aft strut areas or of aft foil dihedral has been used in the past as a means of counteracting the effects of variations in directional stability margin. However, such design features merely reduce, rather than eliminate, the basic source of the problem. The fact that the struts are capable of developing hydrodynamic side-forces in the presence of local side slip makes them the primary contributors to the lateral stability and control characteristics of the craft.

Although the basic principles of operation of hydrofoil craft bear strong similarities to the principles of operation of aircraft, one noteworthy difference exists. Specifically, the "wings" of the hydrofoil craft are physically separated from the "fuselage" by relatively long struts of aerodynamically smooth contour. The basic function of the struts under foilborne conditions is to provide the required physical separation between the foils and the hull to assure proper wave clearance. However, in the early days of submerged-foil hydrofoils, the existence of an effective source of side force in the form of the strut system led to the use of flat or unbanked turns in which the required centripetal forces were developed solely by the strut system. The difficulties associated with maintaining steady flat turns in the presence of variations in strut wetted area produced by wave action and in the presence of strut unwetting due to hydrodynamic loading have been instrumental in causing the flat turn mode to be abandoned by most of the experts in this art. In the steady 100 percent banked (fully coordinated) turn the net side force on the craft must be zero. Accordingly, the individual side forces developed by the forward strut system and by the aft strut system must each be zero in a steady turn. Thus, the struts develop side forces only transiently in the process of developing yawing moments to produce a change in turn rate or in responding to the disturbance effects introduced by orbital motion in rough water.

SUMMARY OF THE INVENTION

The fact that a swiveled strut rudder must develop no average side force in a steady, 100 percent banked, turn has led to the consideration of a free trailing strut. That is, a properly designed free strut that has high weathercock stability about the swivel axis will not develop a steady side force in the presence of side slip but rather will swivel to a streamline position. Thus, instead of automatically controlling the swivel strut so as to maintain zero side force in banked turns, the natural free trailing action of the strut is exploited.

This concept yields two benefits directly. First, the sensors and automatic control electronics required to position the rudder in a banked turn become unnecessary and the usual speed-dependent inadequacies of the control loops are eliminated. Secondly, the hydraulic actuator, hydraulic lines, accumulators, etc. ordinarily required to actuate the swiveled strut are unnecessary.

It should be noted, however, that the natural hydrodynamic rotational damping on a free trailing strut may be inadequate to give the desired free trailing action under dynamic conditions. In such an event, the present invention contemplates the requirement of an auxiliary source of rotational damping such as a fin, the addition of dihedral to the foil or the addition of a hydraulic damper, equivalent to the automotive "shock absorber."

An added benefit of the free trailing forward strut is found in the effect on the inherent lateral stability characteristics of the craft. With regard to directional stability, the fact that the forward strut cannot sustain any significant side force under steady side slip conditions causes the after strut system to be the sole source of such side force. This places the static-neutral-point (the point about which yawing moments are balanced) at the after strut body station. Thus, the static directional stability margin is fixed as the normalized distance from the after struts to the longitudinal center of gravity. It follows that the static directional stability margin is insensitive to variations in relative wetted areas of the forward and aft strut systems. Thus in a properly designed hydrofoil, the free trailing forward strut assures a high and invariant static directional stability margin.

Ordinarily, in aircraft, the achievement of a high static directional (weathercock) stability margin introduces a serious problem of inadequate yaw damping. Typically this problem is solved through the introduction of artificial yaw damping by passive or by automatic control techniques. In the case of the free trailing forward strut, the yaw damping of the craft can be determined easily by the selection of the damping constant on the strut rotational damper. As the damping constant on the strut is increased, the yaw damping contributed by th forward strut is increased in a manner directly equivalent to conventional yaw dampers but without the usual complexity.

With regard to roll stability, the free trailing forward strut has two advantages. First, the reduction in forward strut side force due to side slip that is associated with free trailing produces a direct reduction in roll overturning moment and enhances the roll stability of the craft.

Secondly, the high yawing moment due to side slip that is associated with high static directional stability produces a reduction of side slip on the after struts and thereby a further reduction in roll overturning moment.

In effect, the yaw-roll coupling between high static directional stability and roll instability produces a net improvement in coupled lateral stability as compared to conventional current designs. As noted in the case of yaw damping, the enhancement of static roll stability is not accompanied by a reduction in roll damping if proper rotational damping of the free trailing strut is provided.

The above-described theories and elementary statements were checked and verified by analog computer.

It should be noted that the technique of this invention can be utilized in a more conventional forward strut arrangement that utilizes a conventional actuator for forward strut rotational control. In such an application, the actuator would be used only to augment the natural free trailing action of the strut to assure proper weather-cocking under such extreme conditions as would occur when the tip of the forward foil pierces the surface or some other source of extraneous asymmetrical moment is present on the strut. In such cases the size of the required actuator would be much smaller than ordinarily deemed necessary for conventional designs. Such an arrangement would also find application in those cases in which the auxiliary actuator would be utilized to steer the strut in the hull-borne (displacement) mode of the craft at low speeds.

In summary, the invention is directed to a hydrofoil craft of the "canard" configuration having a single forward uncontrolled free trailing swiveled strut, provided only with a suitable rotational damping means, for improving stability and control of the craft.

It is therefore an object of the present invention to provide for improved stability in hydrofoil craft.

It is another object of the present invention to provide for a hydrofoil craft employing a free trailing rotationally mounted forward strut support means.

It is a further object of the present invention to provide for a hydrofoil craft utilizing fully submerged foils and strut support means in its forward and aft locations and wherein said forward foil and strut arrangement is rotationally positioned for free trailing so that an inherent stability and improved control of the craft is achieved.

A still further object of the present invention is to provide for a free trailing hydrofoil strut assembly which includes an automatic swivel means for swiveling in a trailing or slanted position in reference to the motion of the craft.

Other objects and advantages of the present invention will become more apparent from the following description taken in connection with the accompanying drawings which illustrate a schematic preferred embodiment.

In broad terms, the principle of operation of the present invention relates to a hydrofoil craft comprising a hull carrying a hydrofoil strut assembly which is rotationally mounted to the hull for free rotation about a substantially vertically extended axis and the strut assembly is also adapted to automatically swivel about the axis into a trailing position with respect to the craft motion. Furthermore, the hydrofoil strut is provided with damping means for augmenting the natural hydrodynamic rotational damping experienced by the strut assembly, and preferably the damping means is a mechanical damping mechanism which is mounted between the hull and the strut.

In general, the hydrofoil craft comprises a hull carrying an aft and a forward hydrofoil strut assembly or arrangement wherein the forward strut assembly is mounted to the hull in a free rotational relationship about a substantially vertically disposed axis, and wherein the forward strut assembly is also mounted to swivel automatically in a trailing position during hydrodynamic operations of the craft. The forward strut assembly is further provided with predetermined tuned damping means, and the free rotational mounted relationship comprises a bearing mechanism located between the hull and the strut assembly. Preferably the forward strut assembly is provided with means for pivoting the assembly about a substantially horizontally disposed axis into a fold-away position for improving the travel motion of the craft when hull-borne.

THE DRAWINGS

FIG. 1 is a perspective bottom view of a typical "canard" type strut arrangement on a hydrofoil boat hull;

FIG. 2 is a section view of the mechanical connection of the hydrofoil forward strut;

FIG. 3 is a schematic plan view of an ahead moving hydrofoil boat with the forward strut in a free-trailing, off-center position.

DESCRIPTION OF THE INVENTION

Referring now specifically to FIG. 1, there is illustrated a hydrofoil boat 10 having a forward strut assembly 12 and an aft strut assembly 14.

When the hydrofoil boat 10 is hull-borne (not shown), the aft strut assembly 14 is rotated next to the stern 16 about pivot axis 18, and the forward strut 12 is rotated ahead of the bow 20 and partly within the bow slot 22 about pivot axis 24.

When the hydrofoil boat 10 is foil-borne, both the forward and aft struts 12 and 14 respectively are extended in the downward position as illustrated in FIG. 1. The aft strut assembly 14 is provided with a rudder 30 and roll control means or ailerons 32. During operational conditions of the hydrofoil boat 10, each of the controls 30 or 32 can be utilized for roll control and steering. As a matter of fact, a free swiveling front strut with rudders on the aft struts provides a compensating rolling moment for hard-over rudder which will prevent the ailerons from being overloaded.

Therefore, it should be understood that the illustrations and design configuration in FIGS. 1 – 3 are for exemplary purposes only and that the number of struts, rudders, control locations and various other modes of construction can be contemplated.

As will be noted in FIG. 2, the free swiveling forward strut assembly 12 extends in a slanted downward direction so that a trailing or self-following action is provided for during motion of the boat 10. The forward strut assembly 12 includes a strut 38 that carries a hydrodynamic foil 40 at its lower strut portion 42 and is further connected for free rotation in a bearing assembly 44 at its upper portion 46. The bearing assembly 44 keeps the strut 12 in frictionless free rotation; however, since the forward foil and strut 12 endure a variety of forces of various strengths and durations, exaggerated swiveling may be experienced and therefore a predetermined biased damping means 50 has been incorporated. As illustrated in FIG. 2, an actuator 52 is pivotally mounted between the strut 12 and the boat frame 10 or within the recessed hull slot 22 at points 56 and 58, respectively. Thus a complete free trailing weathercock stability is achieved by the above mechanical arrangement of damper means 50 and bearing assembly 44. Here again, other types of damper means 50 can be used, as mentioned before, without changing the basic operational principles of the present invention.

In a banked turn, either the rudder 30 may be operated or the ailerons 32 as shown in FIG. 1 and FIG. 3, and the forward strut 12 will find automatically a position by swiveling "X" degrees and remain in a substantially steady force-compensating position during this maneuver.

Having now described the invention so that others skilled in the art may clearly understand the same, what it is desired to secure by Letters Patent is as follows:

1. A hydrofoil craft comprising:
   a. a hull,
   b. an aft hydrofoil strut assembly carried by the hull,
   c. aft means carried by the hull for steering the craft,
   d. a forward hydrofoil strut assembly,
   e. and means connecting said forward strut assembly to the hull for free rotation on a substantially vertical axis,
   f. the forward strut assembly being formed to take and maintain a trailing position during hydrodynamic operation of the craft and to automatically swivel on said axis when the craft is turned by said steering means.

2. A hydrofoil craft according to claim 1, wherein said steering means are connected with said aft strut assembly.

3. A hydrofoil craft according to claim 1, wherein said aft strut assembly includes a hydrodynamic foil, and said steering means include roll-control means pivotally connected to said foil.

4. A hydrofoil craft according to claim 1, wherein said forward strut assembly consists of a single strut and a hydrodynamic foil secured to its lower end.

5. A hydrofoil craft according to claim 1, wherein said forward strut assembly is inclined downwardly and rearwardly from said vertical axis.

6. A hydrofoil craft according to claim 1, wherein the bow of said hull is provided with a downwardly opening slot normally containing the upper portion of said forward strut assembly and extending forward therefrom, and said connecting means include a transverse pivot at the upper end of the forward strut assembly to permit that assembly to be swung forward and up into said slot when the craft is hull-borne.

7. A hydrofoil craft according to claim 1, including means connecting said hull and forward strut assembly for damping the swivelling of the forward strut assembly.

8. A hydrofoil craft according to claim 7, wherein said damping means include a piston and cylinder pivotally connected to said hull and forward strut assembly on vertical axes.

9. A hydrofoil craft according to claim 1, wherein said steering means include roll-control means pivotally connected to said aft strut assembly, the craft including means connecting the hull and forward strut assembly for damping the swivelling of the forward strut assembly.

10. A hydrofoil craft according to claim 9, wherein said forward strut assembly is inclined downwardly and rearwardly from said vertical axis.

* * * * *